US008708785B2

(12) United States Patent
Aandewiel et al.

(10) Patent No.: US 8,708,785 B2
(45) Date of Patent: Apr. 29, 2014

(54) POULTRY PROCESSING APPARATUS HAVING ONE OR MORE TRANSFER UNITS

(71) Applicant: Meyn Food Processing Technology B.V., Oostzaan (NL)

(72) Inventors: Leendert Aandewiel, Oostzaan (NL); Aloysius Christianus Maria Van Steijn, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 0 days.

(21) Appl. No.: 13/943,432

(22) Filed: Jul. 16, 2013

(65) Prior Publication Data

US 2014/0024302 A1    Jan. 23, 2014

(30) Foreign Application Priority Data

Jul. 17, 2012   (NL) .................................... 2009198

(51) Int. Cl.
    *A22C 25/04*   (2006.01)
(52) U.S. Cl.
    USPC ........................................................ 452/182
(58) Field of Classification Search
    USPC ............. 452/52, 53, 106, 149, 150, 155–157, 452/198
    See application file for complete search history.

(56) References Cited

U.S. PATENT DOCUMENTS

| 6,059,648 | A  | * | 5/2000  | Kodama et al.  | 452/135 |
| 6,905,404 | B2 | * | 6/2005  | Steffler et al. | 452/149 |
| 7,011,575 | B2 | * | 3/2006  | Smarsh         | 452/141 |
| 7,226,349 | B2 | * | 6/2007  | Berry          | 452/167 |
| 7,798,890 | B2 | * | 9/2010  | Gerrits et al. | 452/53  |
| 7,828,639 | B2 | * | 11/2010 | Nielsen        | 452/198 |
| 8,206,203 | B2 | * | 6/2012  | Gerrits et al. | 452/53  |
| 8,506,365 | B2 | * | 8/2013  | Van Craaikamp  | 452/53  |

FOREIGN PATENT DOCUMENTS

EP   0 736 255 B1   10/1996
EP   1 848 282 B1    2/2009

OTHER PUBLICATIONS

Search report for NL 2009198, dated Feb. 27, 2013.

* cited by examiner

*Primary Examiner* — Richard Price, Jr.
(74) *Attorney, Agent, or Firm* — Dority & Manning, P.A.

(57) ABSTRACT

A processing apparatus for poultry is provided. In an exemplary embodiment, the apparatus includes one or more transfer units placed intermediate of, conveying poultry from, a first line to a subsequent second line, wherein both the first line and the second line are selected from the group including a slaughtering line, an evisceration line, a chilling line, a sorting line and a cutup line. Each transfer unit is embodied with a circulating support that includes material that is magnetically conductive and transfer means are provided with at least one magnet so as to induce eddy currents in the circulating support that counteracts relative motion between the transfer means and the circulating support.

11 Claims, 4 Drawing Sheets

POULTRY PROCESSING APPARATUS HAVING ONE OR MORE TRANSFER UNITS

FIELD OF THE INVENTION

The subject matter of the present disclosure relates generally to a processing apparatus for poultry that includes one or more transfer units.

BACKGROUND OF THE INVENTION

A poultry processing apparatus is known from EP-B-0 736 255 and from EP-B-0 782 823, both in the name of the applicant.

EP-B-1 848 282 discloses another more complex type of processing apparatus for poultry in which a drive is applied for jointly driving a plurality of transfer means, and coupling means associated with each transfer means for coupling to the drive.

Transfer units forming part of certain poultry processing apparatus operate in a relatively polluted environment, due to the grease and blood escaping from the poultry that is being processed. This grease and blood may even mingle with water that is applied in or around the processing apparatus, and the grease and blood may partly solidify. All in all the conditions prevailing in the processing apparatus are unpredictable and, within conventional processing devices, may result at times in poor reliability in the transfer of the poultry from a first line to a subsequent second line selected from the group include a slaughtering line, an evisceration line, a chilling line, a sorting line and a cutup line. This will even get worse and possibly unacceptable with increasing speed of processing. Current processing speeds are at a level of handling 8000 chickens per hour, but industry is aiming to processing speeds of at least 12,000 chickens per hour and possibly 15,000 chickens per hour. Certainly at these increased processing speeds, certain prior art processing apparatuses can be unsuitable.

SUMMARY OF THE INVENTION

The present invention provides a processing apparatus for poultry. In an exemplary embodiment, the apparatus includes one or more transfer units placed intermediate of, and conveying poultry from, a first line to a subsequent second line. Both the first line and the second line are selected from the group that includes a slaughtering line, an evisceration line, a chilling line, a sorting line, a cutup line, and/or another type of line or lines. Each transfer unit is embodied with a circulating support onto which a plurality of transfer means are mounted that, in a not obstructed situation, do not carry out a relative movement with respect to the support yet, in an obstructed situation, such are able to move relative to the support. The circulating support is arranged to convey the transfer means between a supply station at the side of the first line and a discharge station at the side of the second line and vice versa.

According to an exemplary aspect of the present invention, these problems are addressed to a great extent if not entirely by the processing line and the transfer means in accordance with one or more of the appended claims.

In one exemplary aspect, the processing line of the invention differs from the prior art processing line in that the circulating support includes material that is magnetically conductive and that the transfer means are provided with at least one magnet so as to induce eddy currents in the circulating support to counteract relative motion between the transfer means and the circulating support. A substantial advantage of this solution is that grease, blood, and water have no impact on the operability of the eddy currents that counteract any such relative motion between the circulating support and the transfer means. The reliability of the accurate and timely transfer of poultry by the transfer units between the first line and the second line is therefore tremendously improved. The breaking means provided in accordance with exemplary aspects of the invention are moreover maintenance-free, since there is no physical contact between the circulating plate and the magnet of the transfer means that could cause wear and tear. Another advantage is that particularly with increasing speed of processing of poultry and accordingly higher rotational speeds of the circulating plate, the breaking forces induced by the eddy currents are correspondingly increased.

Suitably the magnet can be a permanent magnet or switchable magnet. The application of a switchable magnet is particularly preferable in the exemplary embodiment in which the transfer unit is provided with a receiving station which is drivable in synchronization with the supply station, which transfer unit is further provided with a delivery station which is drivable in synchronization with the discharge station. The transfer unit as applied in this embodiment is also known as buffer unit. In this buffer unit the transfer means are collected in front of a stop that can be actuated for synchronized release of the transfer means to the receiving station and delivery station respectively. The stop then forms the obstruction causing a relative motion of the circulating plate with respect to the obstructed transfer means. With a permanent magnet provided in the transfer means this will result in a continuous inducing of eddy currents in the circulating plate, which can be avoided when the magnets can be switched off.

In another exemplary aspect, the transfer means are provided with two magnets for cooperation with the circulating support, which magnets are provided on opposite sides of an imaginary axis of symmetry of the transfer means. This provides in all practical circumstances effective balancing of the transfer means on the circulating support, also when poultry is suspended from the transfer means.

In another exemplary aspect of the invention, neighboring transfer means that are mounted on the circulating support are provided with permanent magnets of the same polarity at sides of these neighboring transfer means that are facing each other. These permanent magnets are effective in limiting the severity of a collision when a trailing transfer means approaches an earlier transfer means that is already obstructed in its further movement by the circulating plate.

Corresponding to the above, exemplary aspects of the invention are also embodied in separate transfer means for mounting on a circulating support of a processing apparatus as discussed hereabove, wherein the transfer means is provided with at least one magnet.

An exemplary embodiment of the transfer means of the invention has the feature that opposite sides of the transfer means, which during use are perpendicular to their conveying direction, are provided with a magnet. This serves the above mentioned purpose to limit the severity of a collision of a trailing transfer means that approaches an earlier obstructed transfer means.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

The invention will hereinafter be further elucidated with reference to the drawing of a non-limiting, exemplary embodiment of a processing apparatus in accordance with the invention. In the drawings.

Whenever in the figures the same reference numerals are applied, these numerals refer to the same parts.

DETAILED DESCRIPTION OF THE INVENTION

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

Figure 1:
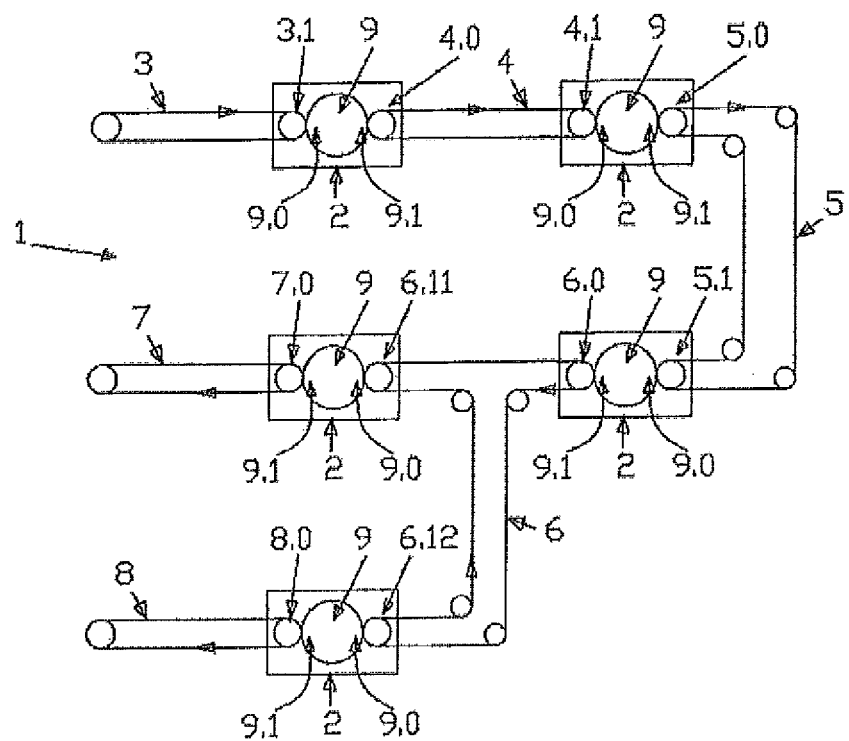
FIG. 1 schematically shows the processing apparatus of the invention.

Referring first to FIG. 1, an exemplary processing apparatus 1 for poultry is shown that includes one or more transfer units 2 placed intermediate processing lines. The transfer units 2 convey poultry from a first line to a subsequent second line, wherein both the first line and the second line are appropriately selected from the group that includes a slaughtering line 3, an evisceration line 4, a chilling line 5, a sorting line 6 and a cutup line 7, 8. Other types of lines are feasible as well. Each transfer unit 2 is embodied with a circulating support 9 and, as shown in FIG. 2, on the circulating support 9 a plurality of transfer means 10 are mounted.

In accordance to what is known from the prior art EP-B-0 736 255 and from EP-B-0 782 823 and which requires therefore no further elucidation, in a not obstructed situation the transfer means 10 do not carry out a relative movement with respect to the support 9, yet in an obstructed situation the transfer means 10 are able to move relative to the support 9. Further in accordance with the prior art and shown in FIG. 1, the circulating support 9 is arranged to convey the transfer means 10 that are shown in FIG. 2 between a supply station 3.1; 4.1; 5.1; 6.11, 6.12 at the side of a first line and a discharge station 4.0; 5.0; 6.0; 7.0; 8.0 at the side of a second line, and vice versa. Correspondingly the transfer unit 9 is provided with a receiving station 9.0, which is drivable in synchronization with an adjacent supply station 3.1; 4.1; 5.1; 6.11, 6.12, and with a delivery station 9.1, which is drivable in synchronization with an adjacent discharge station 4.0; 5.0; 6.0; 7.0; 8.0. This is all clearly disclosed in EP-B-0 736 255 and EP-B-0 782 823 and requires therefore no further elucidation with reference to the drawing.

Figure 2:
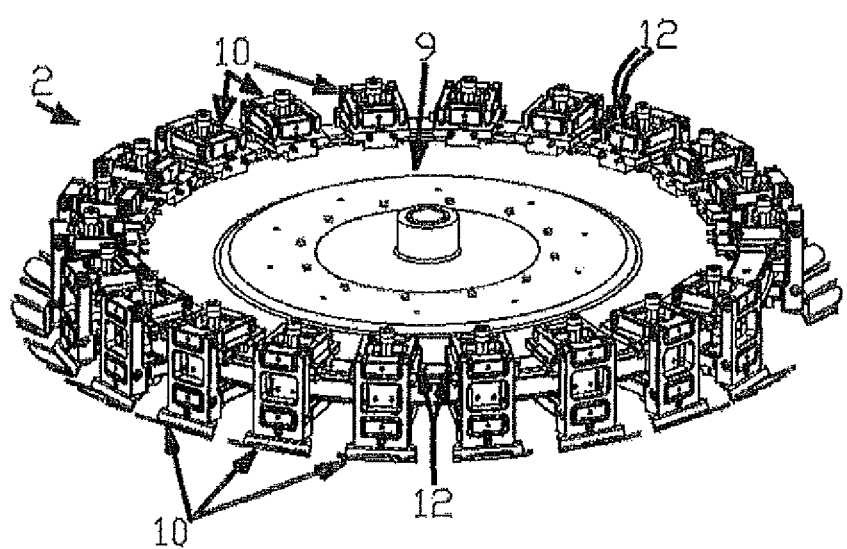
FIG. 2 shows a single transfer unit, several of which may be employed in the processing apparatus of the invention.
Figure 3:
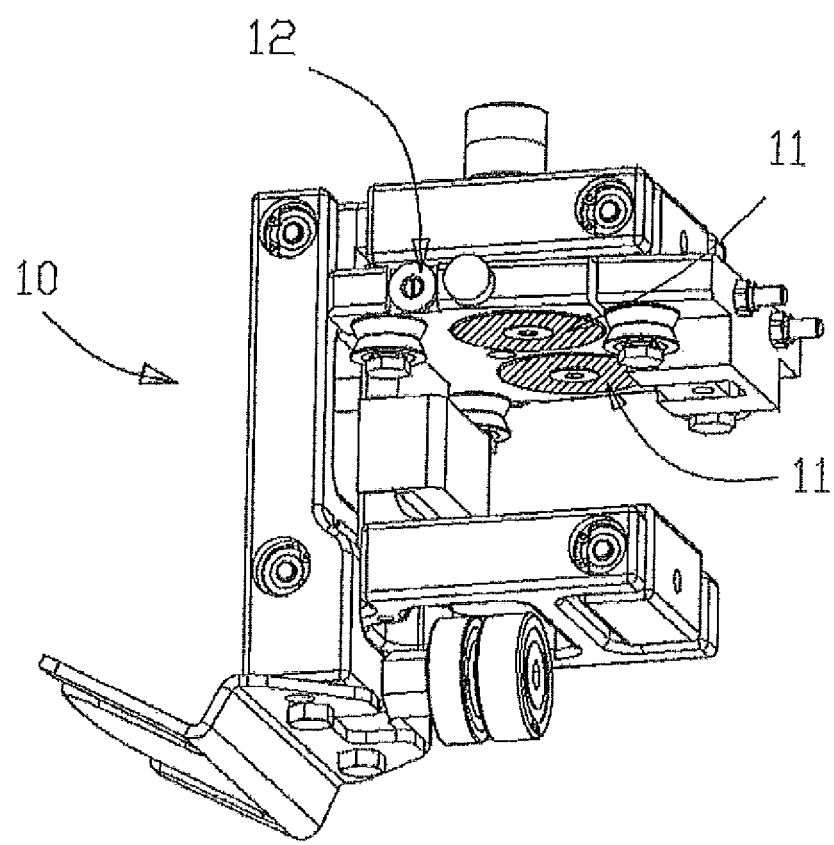
FIG. 3 shows single transfer means for use in the transfer unit shown in FIG. 2.
Figure 4:
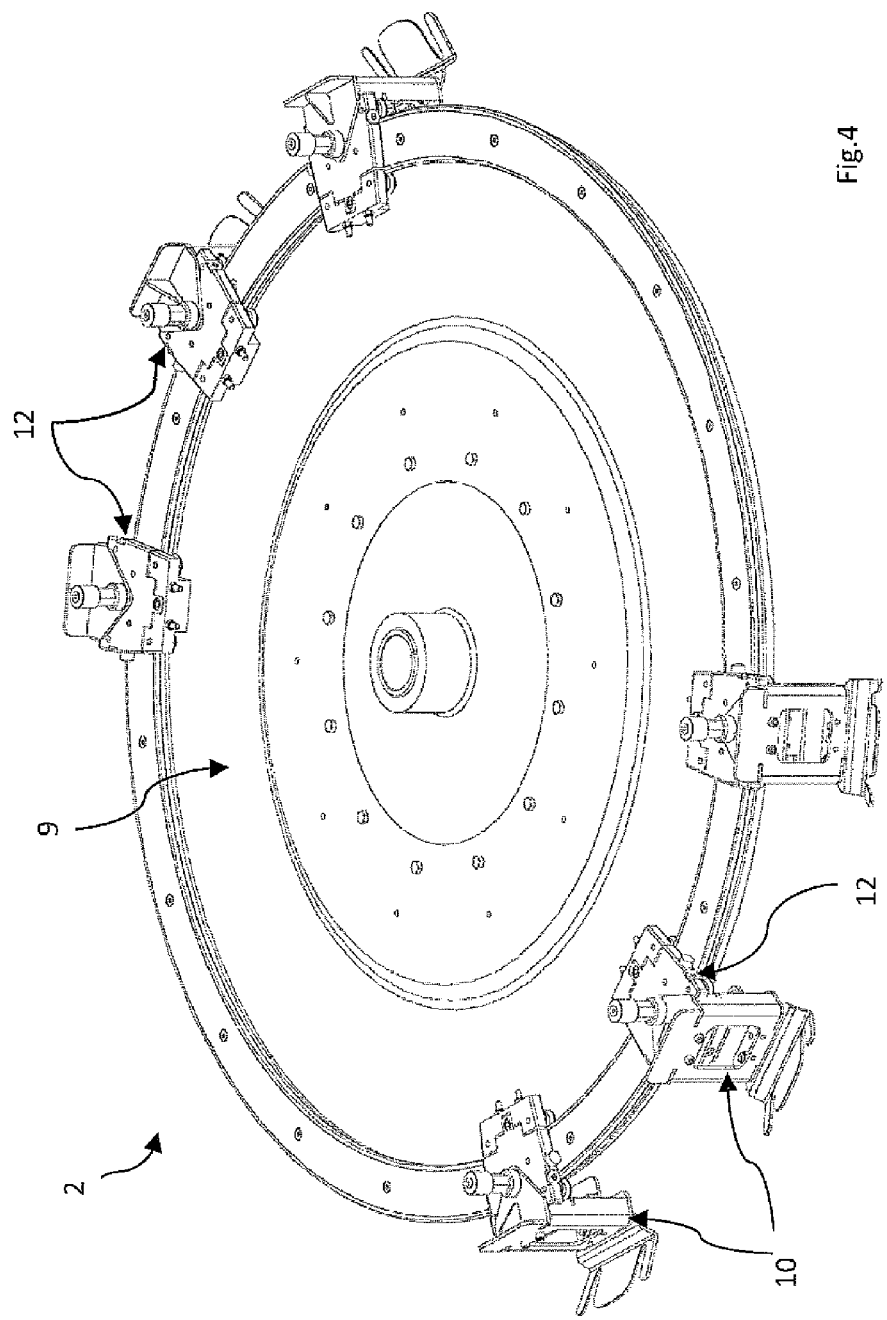
FIG. 4 is a more close-up view of the transfer unit of FIG. 2 with some of the transfer means removed for additional clarity.

In accordance with an exemplary aspect of the invention, the circulating support 9 shown in FIGS. 1, 2 and 4 includes material that is magnetically conductive and each of the transfer means 10 (see FIG. 3) is provided with at least one magnet 11 so as to induce eddy currents in the circulating support 9 that counteracts relative motion between the transfer means 10 and the circulating support 9. The magnet can be a permanent magnet or switchable magnet.

FIG. 3 illustrates that the transfer means 10 are provided with two magnets 11 for cooperation with the circulating support 9, which magnets 11 are provided on opposite sides of an imaginary axis of symmetry of the transfer means 10.

FIGS. 2 and 4 show that neighboring transfer means 10 that are mounted on the circulating support 9 are provided with permanent magnets 12 of the same polarity at facing sides of these neighboring transfer means 10. Likewise, FIG. 3 shows that a side of the transfer means 10 that during use is perpendicular to its conveying direction is provided with a magnet 12 that is intended to cooperate with a similar magnets of same polarity provided on an oppositely facing side of neighboring transfer means.

The applicant wishes to point out that the foregoing description with reference to the drawing is merely intended to elucidate the appended claims without limiting these claims to the discussed embodiment. The scope of protection that merits the invention is exclusively determined by the appended claims, wherein any possible ambiguity can be resolved with reference to the discussed embodiment. While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

The invention claimed is:

1. A processing apparatus for poultry, comprising:
   one or more transfer units, each transfer unit having a side placed intermediate a first line and a side placed intermediate a subsequent second line, the one or more transfer units configured for conveying poultry from the first line to the second line, wherein both the first line and the second line are selected from the group comprising a slaughtering line, an evisceration line, a chilling line, a sorting line, a cutup line, and another type of line or lines;
   wherein each transfer unit comprises
      a circulating support:
      a plurality of transfer means mounted onto the circulating support, each transfer means configured so that in a not obstructed situation each transfer means is able to move with the circulating support so that there is no relative movement of the transfer means with respect to the circulating support, each transfer means also configured so that in an obstructed situation each transfer means is able to move relative to the support;
   a supply station located along the side of the first line;
   a discharge station located along the side of the second line;
   wherein the circulating support is arranged to convey the transfer means between the supply station and the discharge station and vice versa, wherein the circulating support comprises at least one material that is magnetically conductive, and wherein the transfer means are provided with at least one magnet configured to induce eddy currents in the circulating support that counteracts relative motion between the transfer means and the circulating support.

2. A processing apparatus for poultry as in claim 1, wherein the at least one magnet is a permanent magnet or switchable magnet.

3. A processing apparatus for poultry as in claim 1, wherein the transfer unit is provided with a receiving station which is drivable in synchronization with the supply station, and wherein the transfer unit is provided with a delivery station which is drivable in synchronization with the discharge station.

4. A processing apparatus for poultry as in claim 1, wherein the transfer means are provided with two magnets for cooperation with the circulating support, the magnets provided on opposite sides of an imaginary axis of symmetry of the transfer means.

5. A processing apparatus for poultry as in claim 1, wherein the neighboring transfer means that are mounted on the circulating support are provided with permanent magnets of the same polarity at facing sides of the neighboring transfer means.

6. A poultry processing apparatus for transferring poultry between a first line and a second line, the poultry processing apparatus comprising:
   a supply station;
   a discharge station;
   a transfer unit having a side placed intermediate the first line and another side placed intermediate the second line, wherein the supply station is located along the side of the first line and the discharge station is located along the side of the second line, the transfer unit configured for conveying poultry from the first line to the second line, the transfer unit comprising
   a plurality of transfer means; and
   a circulating support onto which the plurality of transfer means are mounted, the transfer means selectively movable relative to the circulating support, the circulating support configured for conveying the transfer means between the supply station and the discharge station, and vice versa, the circulating support comprising at least one material that is magnetically conductive;
   wherein the transfer means further comprises a magnet configured to induce eddy currents in the circulating support so as to selectively counteract relative motion between the transfer means and the circulating support.

7. The poultry process apparatus as in claim 6, wherein the magnet is a permanent magnet.

8. The poultry process apparatus as in claim 6, wherein the magnet is a switchable magnet.

9. The poultry process apparatus as in claim 6, wherein the transfer unit is provided with a receiving station which is drivable in synchronization with the supply station, and wherein the transfer unit is provided with a delivery station which is drivable in synchronization with the discharge station.

10. The poultry process apparatus as in claim 6, wherein the transfer means comprise two magnets for cooperation with the circulating support, the magnets provided on opposite sides of an imaginary axis of symmetry of the transfer means.

11. The poultry process apparatus as in claim 6, wherein the neighboring transfer means that are mounted on the circulating support are provided with permanent magnets of the same polarity at facing sides of the neighboring transfer means.

* * * * *